Patented Dec. 30, 1952

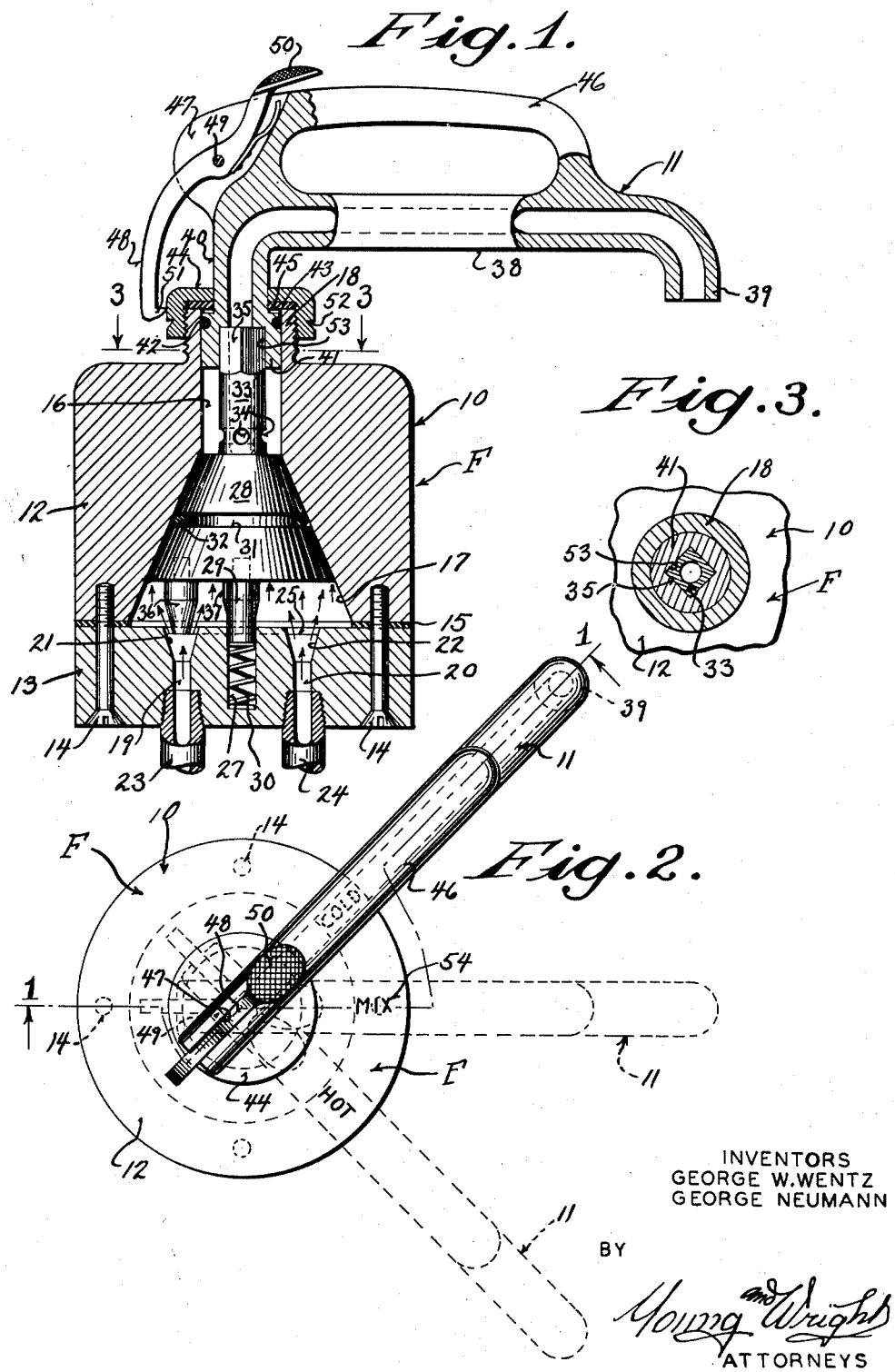

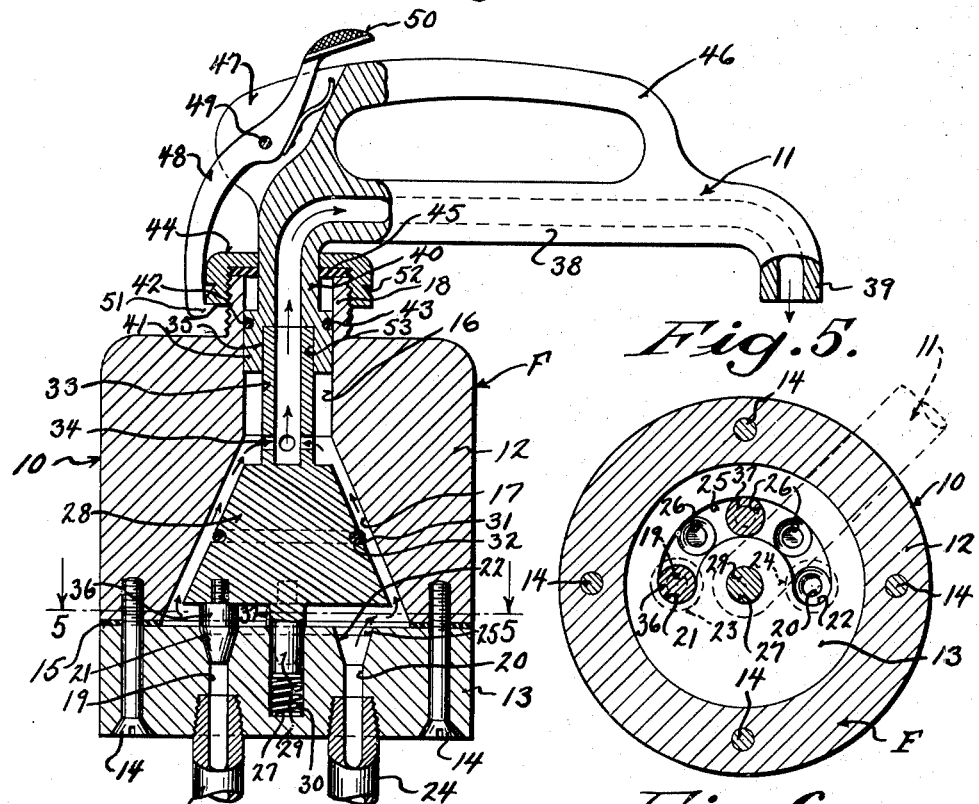

2,623,752

UNITED STATES PATENT OFFICE 2,623,752

SINGLE MIXING VALVE

George W. Wentz and George Neumann, Milwaukee, Wis.

Application September 18, 1950, Serial No. 185,392

2 Claims. (Cl. 277—20)

1

This invention appertains to a novel hot and cold water mixing faucet, and is an improvement over the faucet shown in our pending application, Serial No. 141,877, filed February 2, 1950.

One of the primary objects of our present invention, is to provide a faucet for sinks and basins for controlling the flow of hot or cold water, or a mixture thereof, through a single delivery spout, with means for operating the valve of the faucet from the spout itself, the position of the spout relative to the faucet casing indicating the desired selection of hot, cold, or a mixture of hot and cold water.

Another salient object of our invention is the provision of the use of a single valve for controlling the flow of hot or cold water or a mixture thereof, through an outlet spout, in which the pressure of the water aids in the holding of the valve on its seat to prevent leakage of water when the faucet is not in use.

A further object of the invention is to provide a combination rotary and reciprocating valve actuated directly from the outlet spout, the turning of the spout positioning the valve for the proper selection of hot, cold, or a mixture of hot and cold water, and the lowering of the spout and valve functioning to move the valve off of its seat for the delivery of the water to the spout.

A further important object of the invention is to provide means, whereby the valve and spout can be conveniently latched in a lowered, or partially lowered, position to hold the valve either in a fully, or a partially opened water delivery position.

A still further object of the invention is to provide novel means for construction of the valve itself, whereby the valve will effectively perform the dual function of closing off all flow of water to the spout and for selectively cutting off either the hot or cold water pipes.

With these and other objects in view, the invention consists in the novel construction, arrangement and formation of parts, as will be hereinafter more specifically described and claimed, and illustrated in the accompanying drawings, in which drawings:

Figure 1 is a vertical sectional view through our improved faucet, the section being taken on the line 1—1 of Figure 2, looking in the direction of the arrows, the view showing the valve in its completely closed position.

Figure 2 is a top plan view of the faucet.

Figure 3 is a detail horizontal sectional view taken on the line 3—3 of Figure 1, looking in the direction of the arrows, illustrating the novel connection between the spout and the valve.

Figure 4 is a view similar to Figure 1, but showing the valve in an open position for the delivery of cold water to the spout.

Figure 5 is a horizontal sectional view through the valve casing, taken on the line 5—5 of Figure 4, looking in the direction of the arrows.

Figure 6 is a view similar to Figure 5, but show-

2 ing the valve positioned for delivering a mixture of hot and cold water to the spout.

Figure 7 is a view similar to Figures 5 and 6, but showing the valve positioned for delivering hot water only to the spout.

Figure 8 is a fragmentary detail vertical sectional view, taken on the line 8—8 of Figure 6, looking in the direction of the arrows, and showing the valve positioned for permitting the delivery of a mixture of hot and cold water to the spout.

Referring to the drawings in detail, wherein similar reference characters designate corresponding parts throughout the several views, the letter F generally indicates our improved faucet, and the same includes a valve casing 10, having associated therewith, a swinging spout 11, which forms an important part of the invention.

The casing 10, is preferably formed in an upper section 12, and a lower section 13, and these sections are rigidly secured together by machine screws 14. A gasket 15, is preferably interposed between the sections so as to prevent leakage of water. The section 12 is provided with a centrally disposed way 16, the lower end of which is flared outwardly and downwardly to provide a tapered valve seat 17. The extreme upper end of the section 12 can be provided with an externally threaded neck 18 around the way 16, for a purpose which will later appear.

The lower section 13 is provided at substantially diametrically extending points with passageways 19 and 20 and the passageway 19 can constitute an inlet for hot water and passageway 20 can constitute an inlet for cold water. The upper ends of the passageways have their walls tapered upwardly and outwardly to provide valve seats 21 and 22, respectively. Hot and cold water delivery pipes 23 and 24 can be connected in any preferred manner with the lower section 13 for communication respectively with the passageways 19 and 20. The upper face of the section 13 is provided with a semicircular guide groove 25 and it is to be noted that the passageways 19 and 20 open into this groove and that the valve seats 21 and 22 are located in the opposite terminals of the groove. Also formed in the section 13 are tapered sockets 26, which open into the groove, and it is to be noted that three of these sockets are provided and that the sockets and the valve seats 21 and 22 are equidistantly spaced one from the other. Disposed at the axial center of the section 13 is a relatively deep guide opening 27, and the semicircular groove 25 is concentric with this guide opening.

Slidably and rotatably mounted within the valve seat 17 is a conical valve body 28, and it is to be noted that this valve body is of a less height than the length of the valve seat 17. Formed on, or secured to the axial center of the valve body 28, is a depending guide pin 29, which is slidably received within the guide opening 27. A spring 30 is also positioned in the opening 27 and functions to normally lift the valve body into intimate engagement with its seat 17 closing off the flow of water to the spout 11. It also can be seen that the pressure of water flowing into the valve casing will function to also hold the valve body on its seat. If desired, the valve body 28, intermediate its ends can be provided with an annular groove 31 for the reception of a packing ring 32, which aids in preventing the leakage of water around the valve body 28 when the same is in an elevated closed position. Formed on, or secured to the upper end of the valve body 28, is an axially disposed hollow valve stem 33, and the lower end of the stem has formed therein ports 34, which communicate with the interior of the stem. The upper end of the stem is preferably of a polygonal shape, as indicated by the reference character 35, for a purpose, which will later appear. The lower face of the valve plug, has formed thereon or secured thereto depending tapered valve plugs 36 and 37, which travel in the semicircular guide groove 25, during the turning movement of the valve body 28. These valve plugs can be positioned to fit in the valve seats 21 and 22, and the sockets 26, as will later appear, when the valve body 28 is moved to certain selected positions.

Referring to the spout 11, the same includes an elongated tubular section 38 having a down turned delivery spout portion 39, at its outer end and a down turned water receiving portion 40, at its inner end. This portion 40 has formed on its lower end a cylindrical guide head 41, which is slidably and rotatably received in the upper portion of the way 16. In order to prevent the seeping of water between the outer surface of the cylindrical head 41 and the way 16, the outer surface of the head can be provided with an annular groove 42, in which is fitted a packing ring 43. A bonnet 44 is threaded on the neck 18 about the down turned portion 40 of the spout and a suitable gasket 45 is placed in the bonnet for engaging the upper end of the neck 18 and the outer surface of the spout portion 40. Formed on the spout 11 is a hand grip 46 and the hand grip 46 and the spout are preferably of an ornamental nature so that the same will present a pleasing appearance to the eye. The inner end of the hand grip is cut away to provide a groove 47 for the reception of a pivoted latch 48. A pivot pin 49 extends through the latch 48 and the hand grip, so as to permit free swinging of the latch. The upper end of the latch is provided with a thumb piece 50 to permit the convenient actuation thereof by an operator. The lower end of the latch is provided with a nose 51 which is adapted to hook under the bonnet or hook in an annular groove 52 formed in the outer surface of the bonnet.

The head 41 on the inner end of the spout is provided with an interior polygonal seat 53 to receive the polygonal end 35 of the stem, and hence the spout 11 and the valve body 28, can be turned as a nut, as heretofore intimated.

In operation of the improved faucet and considering that the spout 11 is turned to the position shown in Figure 1, with the spout raised; then the water will be completely shut off. At this time, it is to be noted that the upper face of the faucet casing 12 can be provided with suitable indicia 54 to indicate position of the spout for hot, cold, or a mixture of hot and cold water. In Figures 1 and 2, the spout is in position for the delivery of cold water and by pressing down on the handle 46, the spout and the valve body 28 will be lowered, see Figure 4, and water can flow around the valve body and into the stem 33 and out of the spout 11. As the spout is lowered, the latch will automatically hook under the bonnet 44 or in the groove 52, and consequently the valve body will be held off of its seat. By pressing on the thumb piece 50, the latch can be moved to an inoperative position to allow the automatic resetting of the valve body. With the valve body in its lowered position, as shown in Figures 4 and 5, the valve plug 36 will close the flow of hot water and cold water can flow through the cold water inlet 20. The other valve plug 37 seats in one of the sockets 26.

If a person desires a mixture of hot and cold water, and considering that the valve body 28 is in its raised position, then the spout 11 is turned to an intermediate position, to the word "Mix" and upon the depressing of the spout, see Figure 6, the valve plugs 36 and 37 will seat in two of the sockets 26, and both the hot and cold water inlets 19 and 20 will be opened and the water will flow into the valve casing and out of the hollow stem 33 and into the spout.

If hot water alone is desired, and considering that the valve body is in its raised position, then the spout 11 is turned all of the way to the left, see dotted line showing in Figure 2, above the word "Hot" and upon the depressing of the spout the valve plug 37 will seat in the valve seat 22 and the hot water inlet 19 will be open, and consequently, hot water only will be delivered to the spout.

From the foregoing description, it can be seen that various changes in detail may be made without departing from the spirit or the scope of this invention, but what we claim as new is:

1. A faucet for controlling the flow of hot or cold water or a mixture of hot and cold water comprising a casing having an interior chamber forming a valve seat and a way opening out through the upper end of the casing, the lower wall of said chamber being provided with a semicircular guide groove and equidistantly spaced hot and cold water inlets and sockets opening into the groove, a conical valve body slidably and rotatably mounted in said chamber, means normally holding the valve body in a raised position on its seat, valve plugs depending from the body for selective engagement in the sockets and in the hot and cold water inlets when the body is in a lowered position, a swinging spout carried by the casing and a hollow stem on the upper end of the valve body connected with the inner end of the spout for communication therewith, said hollow stem having inlet ports communicating with the chamber.

2. The faucet as defined in claim 1, and a latch carried by the swinging spout for engaging a part of the casing for holding the spout and valve body in a lowered position.

GEORGE W. WENTZ.
GEORGE NEUMANN.

REFERENCES CITED

The following references are of record in the file of this patent:

UNITED STATES PATENTS

| Number | Name | Date |
| --- | --- | --- |
| 680,447 | Swedin | Aug. 13, 1901 |
| 1,138,187 | Bridges | May 4, 1915 |
| 1,305,023 | Stuart | May 27, 1919 |
| 1,842,894 | Breegle | Jan. 26, 1932 |
| 1,843,930 | Patterson | Feb. 9, 1932 |
| 2,341,940 | Millington | Feb. 15, 1944 |